G. VERGOTE.
PNEUMATIC TIRE PROTECTOR.
APPLICATION FILED JULY 24, 1909.
963,667.
Patented July 5, 1910.
2 SHEETS—SHEET 2.
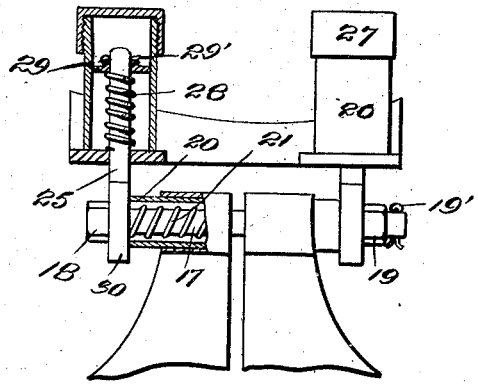
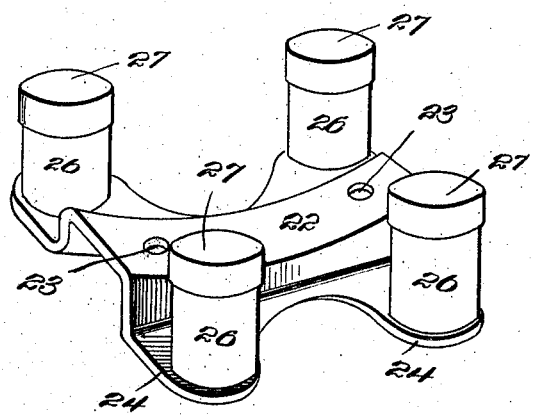
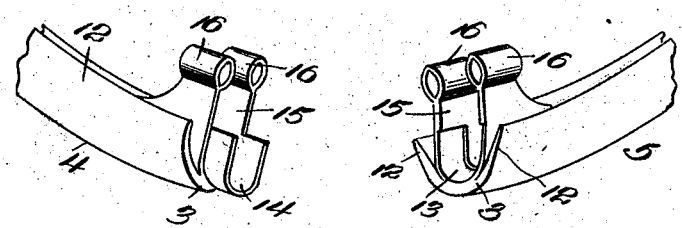
Witnesses
Inventor
Gustave Vergote.
By Victor J. Evans
Attorney

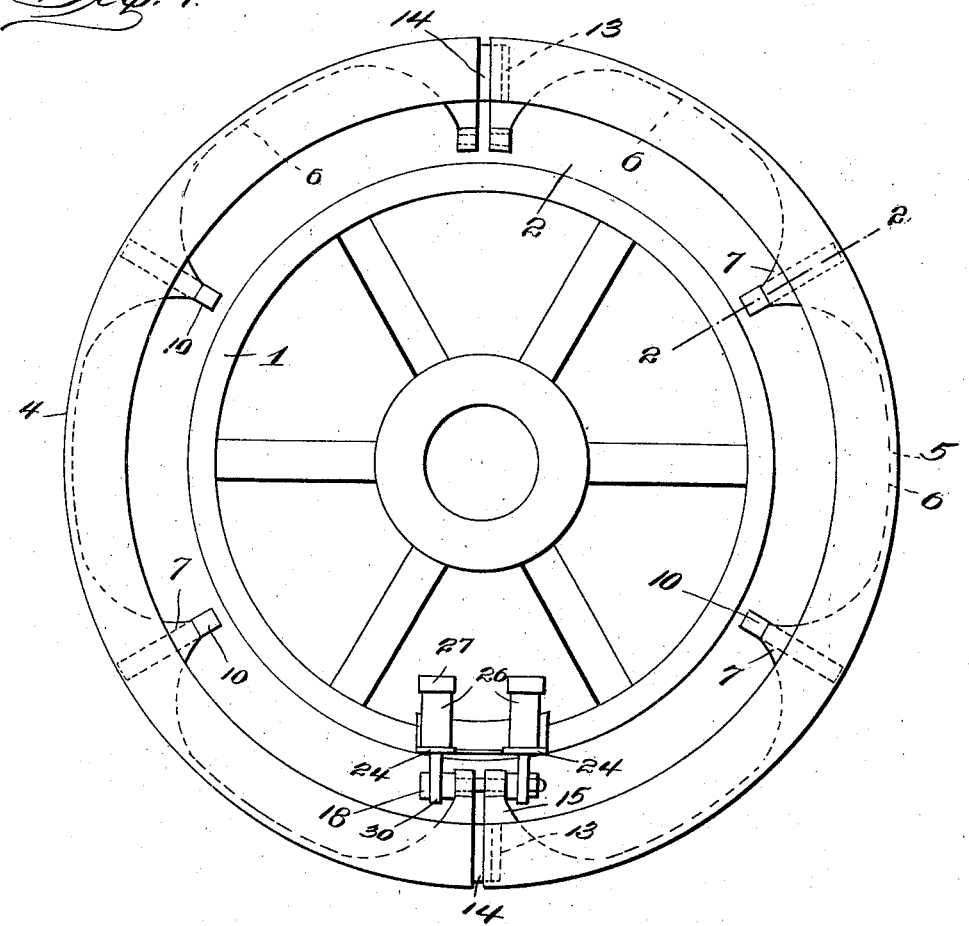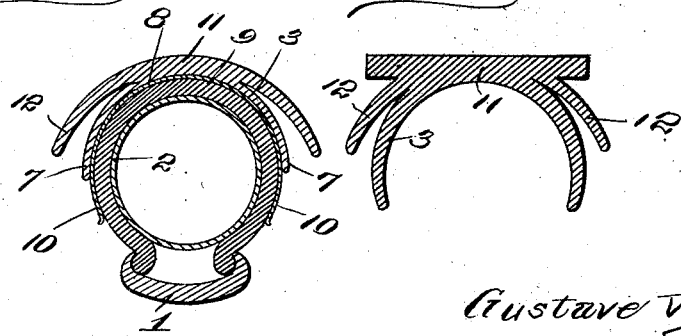

UNITED STATES PATENT OFFICE.

GUSTAVE VERGOTE, OF MARSHALL, MINNESOTA

PNEUMATIC-TIRE PROTECTOR.

963,667.

Specification of Letters Patent. Patented July 5, 1910.

Application filed July 24, 1909. Serial No. 509,315.

*To all whom it may concern:*

Be it known that I, GUSTAVE VERGOTE, a citizen of the United States, residing at Marshall, in the county of Lyon and State of Minnesota, have invented new and useful Improvements in Pneumatic-Tire Protectors, of which the following is a specification.

This invention relates to a protector for pneumatic tires, the object of the invention being to provide a protector which, while allowing ample expansion and contraction of the tire will securely protect the same against injury, and which may be easily applied and removed, will firmly retain its position on the tire, and may be manufactured and sold at a comparatively low cost.

The invention consists of the features of construction, combination and arrangement of parts hereinafter fully described and claimed, reference being had to the accompanying drawings, in which:—

Figure 1 is a side elevation of a vehicle wheel embodying my invention, one of the coupling devices being removed. Fig. 2 is a cross section on line 2—2 of Fig. 1. Fig. 3 is a sectional side elevation showing the means for coupling and fastening the adjacent ends of the protector sections. Fig. 4 is a perspective view of the clip or saddle piece thereof. Fig. 5 is a perspective view showing the construction of the meeting ends of the protector sections. Fig. 6 is a cross sectional view of the protector, showing a modification in the form thereof.

Referring to the drawings, 1 designates the rim of an automobile or other vehicle wheel, to which is applied in any suitable manner a pneumatic tire 2 of any preferred type or construction.

The protector comprises a channeled cover 3, adapted to fit around and inclose the tread portion and the outer surfaces of the sides of the tire. This cover is preferably made of metal having more or less resiliency, but may be made of any other suitable material. It is preferably composed of two or more sections, to enable it to be readily applied and removed, two semicircular sections 4 and 5 being shown in the present instance, which sections when united are adapted to snugly embrace the inflated tire.

Each semicircular channeled section of the cover is preferably formed with scalloped side edges, providing alternate recesses 6 and arms or projections 7, the recesses 6 exposing sufficient of the sides of the tire for maximum expansion and contraction, while the projections 7 serve to limit the lateral expansion of the tire and to hold the protector in position against lateral displacement. In order to insure the firm retention of the protector in position, each protector section is provided at fixed intervals with spring clamps 8. Each of these clamps is of U-form and has its body portion seated within a groove 9 formed on the inner face of the cover 3 so as to lie flush therewith, and having its ends 10 extending downward on the opposite sides of the cover under and inwardly beyond the projections 7 to form spring fingers 10 to yieldingly engage the sides of the tire, as clearly shown in Figs. 1 and 2. The extremities of these fingers are preferably bent outward to prevent them from chafing or otherwise injuring the tire.

The channeled cover or protector is provided with a thickened central tread portion 11, whose outer surface may be convexly curved, as illustrated in Figs. 1 and 2, laterally extended and flattened, as shown in Fig. 6, or of any other desired form and of any required width, as different conditions of service may demand. Laterally extending, inwardly curved guard flanges or wings 12 are preferably formed integral with said tread portion and project outward to a sufficient extent to permit free expansion of the tire. These flanges cover the recesses 6 and portions of the arms 7 to shield and protect the portions of the sides of the tire which would otherwise be exposed through said openings. The spring metal of which these flanges or wings are formed adapt them to yield when coming into contact with obstructions, whereby injury to or breakage of said flanges will be prevented.

Each section of the protector is constructed in the manner above described, and the meeting ends of one section are formed with recesses 13 to receive tongues or projections 14 on the meeting ends of the other sections, thus adapting the ends of the sections to overlap and form closed joints, while providing for their ready application to and removal from the wheel and their relative yielding movement circumferentially of the wheel to the required extent to compensate for the contraction and expansion of the tire.

The meeting ends of the protector sections 4 and 5 are provided with counterpart pairs of coupling arms or straps 15 formed with registering eyes 16 for the passage of securing bolts 17 each at one end provided with a hood 18 and at its opposite end with a retaining nut 19 and nut locking pin 19'. Slidably mounted in said eyes 16 are tubes or sleeves 20, each of which projects outwardly beyond the eye and receives a coiled spring 21, which spring incloses the adjacent end of the bolt and bears at its opposite ends against the head of the bolt and inner end of the eye, to permit the ends of the sections 4 and 5 to have a slight amount of relative play to adapt them to readily accommodate themselves to the movements of the tire, while retaining the ends of said sections in firm engagement against displacement.

Associated with each set of straps or arms 15 and bolts 17 is a clip or saddle 22 formed of metal and channeled to engage the inner face of the rim 1. This clip or saddle may be secured to the rim by suitable fastenings passing through openings 23 therein and is formed at each side with a pair of laterally extending ears 24 apertured for the passage of rods 25. The ears support cylinders 26 each closed at its inner end by a removable cap or head 27. The rods 25 are slidable through the cylinders and openings in their heads and their inward sliding movement is yieldingly resisted by coiled springs 28 inclosed within the cylinders, each spring being arranged to encompass the rod between the ear 24 and a washer 29 held by a key 29' at the outer end of the rod so as to be compressed when the rod slides inwardly and to normally expand and force the rod outwardly. The outer ends of the rods are provided with eyes 30 which engage the outer ends of the bolts 17 and are respectively arranged between the outer ends of the sleeves and the heads and retaining nuts of the bolts. By this construction it will be seen that when the tire yields inwardly, the adjacent ends of the protector sections are free to yieldingly move inward therewith to the extent allowed by the rods and springs, which in effect form spring cushions or plungers. It will be observed that the outer ends of the tubes or sleeves 20 are arranged to bear against the eyes 30 of the adjacent rods and said tubes are thus held from outward movement, so as to permit the eyes 16 to slide thereon. It will be apparent from the foregoing description that this telescopic connection between the eyes 16 and tubes 30 permits the ends of the protector sections 4 and 5 to yield to the slight extent allowed by the cushioning springs 21 to permit play of said sections in the movements of the tire.

From the foregoing description, it will be seen that my invention provides a protector composed of sections which may be readily applied to the tire for use and removed therefrom when occasion requires, and that the coupling means allows said sections to have both radial and circumferential yielding movement to restricted degrees to adapt the protector to have sufficient play to permit the tire to freely expand and contract without liability of separating said sections or causing their displacement from the tire. Also it will be seen that the construction of the protector is such as to prevent the same from chafing the tire and also serves as an effective guard against puncturing by nails, particles of glass and other sharp substances.

Other conveniences and advantages of the invention will be apparent to those versed in the art.

Having thus fully described the invention, what is claimed as new, is:—

1. A protector for pneumatic tires comprising a channeled cover embodying a tread portion having scalloped side edges presenting alternately arranged recesses and spaced lateral arms at each side thereof, flanges extending laterally from said tread portion and covering said recesses and partially covering the arms, and clamps extending transversely beneath said tread portion and arms and having spring fingers terminating adjacent to and beyond the ends of the arms to bear against the sides of the tire.

2. A protector for pneumatic tires comprising a plurality of channeled sections to embrace the outer portion of the tire, said sections being provided with meeting ends having coupling members thereon, bolts uniting the adjacent coupling members, spring means associated with the bolts and coupling members to permit relative yielding movement of the latter, fastening elements adapted for attachment to the rim of the wheel, and cushioning connections between said fastening means and the coupling bolts.

3. A protector for pneumatic tires comprising a channeled cover formed of a plurality of sections, each of said sections being provided with scalloped side edges forming alternately arranged recesses and arms, laterally extending flanges carried by the tread portion and covering the recesses and partially covering the arms, spring clips carried by the arms to engage the sides of the tire, and means for coupling the cover sections.

4. A protector for pneumatic tires comprising a plurality of channeled sections having meeting ends and adapted to inclose the tire, coupling members on the meeting ends, brackets adapted to be secured to the rim of the wheel, yielding connections between the coupling members, and yielding connections between the first named yielding connections and the brackets, said connections being adapted to respectively permit yielding radial and circumferential movements of the protector sections.

5. A protector for pneumatic tires comprising a plurality of channeled sections having meeting ends and adapted to inclose the tire, coupling arms, upon the meeting ends of said sections, said arms being provided with eyes, brackets adapted to be secured to the rim of the wheel, rods slidably engaging the brackets, springs for permitting radial yielding movement of said rods, bolts passing through the eyes of the coupling arms and engaging said rods, and springs for permitting yielding sliding movement of said arms on the bolts between the rods.

6. A pneumatic tire protector comprising a channeled cover formed of sections, cushioning connections between the ends of the sections adapted to permit yielding circumferential movement thereof, brackets adapted for attachment to the rim of the wheel and cushioning connections between said brackets and the protector sections adapted to permit yielding radial movement of the latter.

7. A pneumatic tire protector comprising a channeled cover formed of sections, spring fingers upon the sections to yieldingly engage the sides of the tire, cushioning connections between the ends of the sections including bolts, coupling members slidable on the bolts, and springs for opposing such movement, brackets adapted for attachment to the rim of the wheel, and spring controlled rods carried by said brackets and connected with said bolts.

In testimony whereof I affix my signature in presence of two witnesses.

GUSTAVE VERGOTE.

Witnesses:
O. A. LENDE,
ROBERT M. ADDISON, Jr.